United States Patent [19]

Fowler et al.

[11] 3,903,770

[45] Sept. 9, 1975

[54] SHEAR FEEDING SYSTEM TO FRONT GAUGES USING MAGNETIC DELIVERY MEANS AND A VERTICALLY YIELDING SUPPORT TABLE

[76] Inventors: Alexander Fowler; Joseph M. Fowler, both of 334 Westover Rd. P.O. Box No. 384, Stamford, Conn. 06902

[22] Filed: Nov. 15, 1973

[21] Appl. No.: 415,935

[52] U.S. Cl. .......... 83/71; 83/157; 83/269; 83/419; 83/436; 83/451
[51] Int. Cl. .......... B23d 15/08; B23d 33/02
[58] Field of Search ........... 83/157, 268, 269, 207, 83/419, 391, 392, 436, 71, 451; 271/18.2, 265; 214/1.6

[56] References Cited
UNITED STATES PATENTS

| | | | |
|---|---|---|---|
| 455,053 | 6/1891 | Pettigrew et al. | 83/269 X |
| 1,161,038 | 11/1915 | Eaton | 83/419 |
| 2,815,074 | 12/1957 | Dehn | 83/268 X |
| 2,933,966 | 4/1960 | Dehn | 83/157 X |
| 3,228,680 | 1/1966 | Fowler | 271/265 |
| 3,600,993 | 8/1971 | Williams et al. | 83/157 X |
| 3,688,619 | 9/1972 | Yabuta | 83/419 X |
| 3,760,668 | 9/1973 | Spaulding | 83/157 X |

Primary Examiner—Frank T. Yost

[57] ABSTRACT

A feed system for moving sheet material along a feed path from behind a squaring shear between the shear knives to gauging stops in front of a shear using reversible magnetic conveyors for delivery and a vertically yielding table to avoid interfering with the ram of the shear during the cutting cycle. A preferred embodiment uses dual tracks of reversible magnetic conveyors which can be alternately actuated to place sheet material positively against front stops. The preferred embodiment is also programmable to allow sequenced feeding to accommodate squaring, resquaring and secondary cutting operations to a front gauge or a back gauge.

8 Claims, 3 Drawing Figures

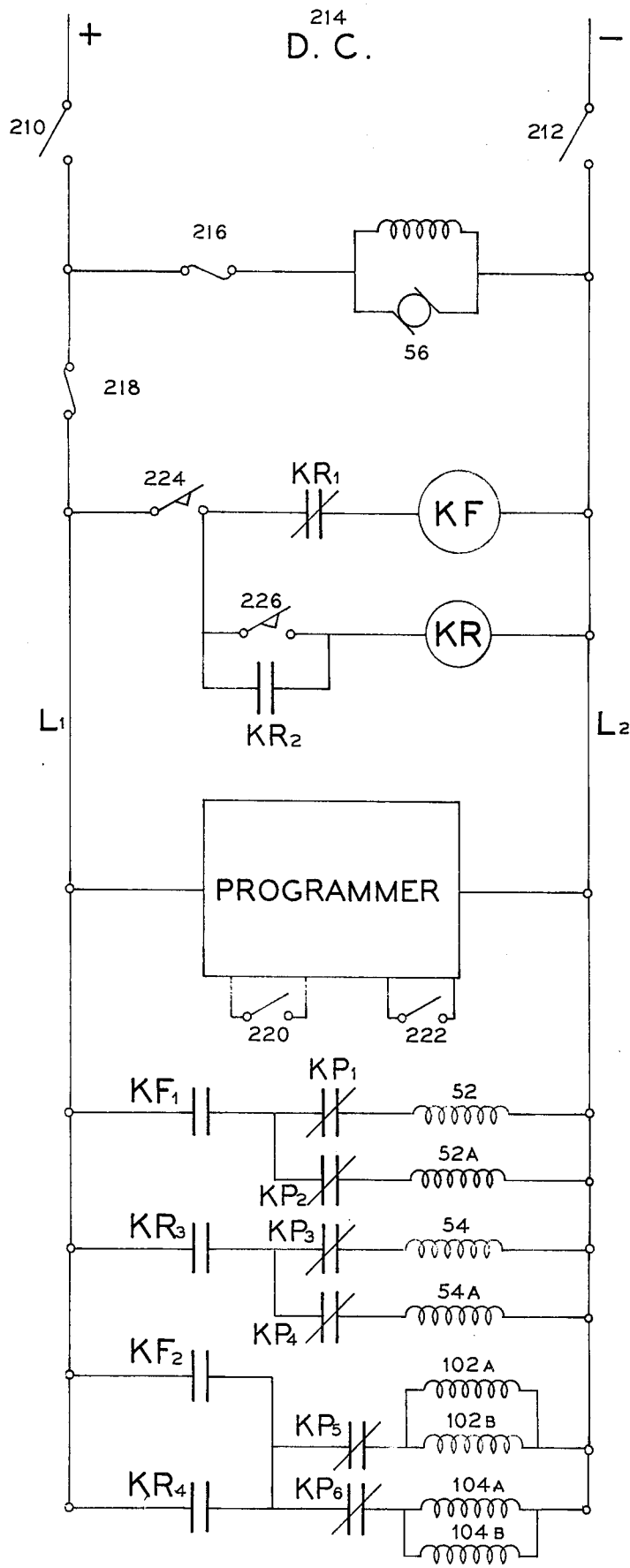

3,903,770

SHEAR FEEDING SYSTEM TO FRONT GAUGES USING MAGNETIC DELIVERY MEANS AND A VERTICALLY YIELDING SUPPORT TABLE

BACKGROUND OF THE INVENTION

This invention relates to feeding and positioning apparatus for sheet material and more particularly to auxiliary apparatus for feeding sheet material to a power operated squaring shear.

One method of accurately shearing sheet material involves feeding the material from behind a squaring shear, placing it between the shear knives, and urging it along a horizontal feed path against gauges mounted in front of the shear. The shear operator, at his normal work station, can insure positive placement of the sheet material against the gauges from his vantage point in front of the shear. Feeding sheet material in this manner is accomplished manually or by means of a power operated shear feed. The prior art reveals a shear feed separate from the squaring shear to which it is servient. As such the shear feed is unable to deliver effectively material shorter in length than the horizontal depth of the ram of the particular shear to which it feeds because of the danger that the shear feed will interfere with the ram of the shear as it vertically descends. Furthermore, the ram of a squaring shear at the bottom of its stroke causes undesirable deflection in material supported by the shear feed because the shear feed maintains horizontal sheet support for the duration of the cutting cycle. It is also difficult for the shear operator to manually position heavy sheets of material against front gauges of a shear, especially when the material comes to rest in a skewed or uneven position.

SUMMARY OF THE INVENTION

Our invention resides in the combination of a shear feed, a machine comprising reversible feed and support rollers for conveying sheet material to front gauges of a power operated squaring shear, and a squaring shear, and their relation to one another in a manner as to allow vertical displacement of the feed rollers of the shear feed in order to avoid interference with the ram of the shear as it progresses through its cutting cycle. In addition, the shear feed is provided with separate tracks of reversible, independently actuated magnetic feed rollers which facilitate the proper placement of heavy sheet material against front gauges of the shear.

Accordingly, a primary purpose of the present invention is generally to improve the feeding of sheet material by a shear feed to front gauges of a squaring shear.

A more specific object is to provide feeding apparatus which is vertically yieldable in order to avoid the ram of the shear as it progresses through its cutting cycle thereby facilitating the feeding of the sheet material to front gauges and eliminating deflection in the material being supported by the shear feed.

A further object is to provide apparatus of this type with separate tracks of reversible, independently actuated, magnetic feed rollers to facilitate proper placement of sheet material in the work area of the shear.

These objects as well as other objects which will hereinafter appear, are more particularly described in the following detailed specification.

BRIEF DESCRIPTION OF THE DRAWING

The specification is accompanied by drawings in which:

FIG. 3 is an electrical wiring diagram of the control mechanisms for operating the shear feed apparatus of FIGS. 1 and 2.

DESCRIPTION OF THE PREFERRED EMBODIMENTS

Figure 1:
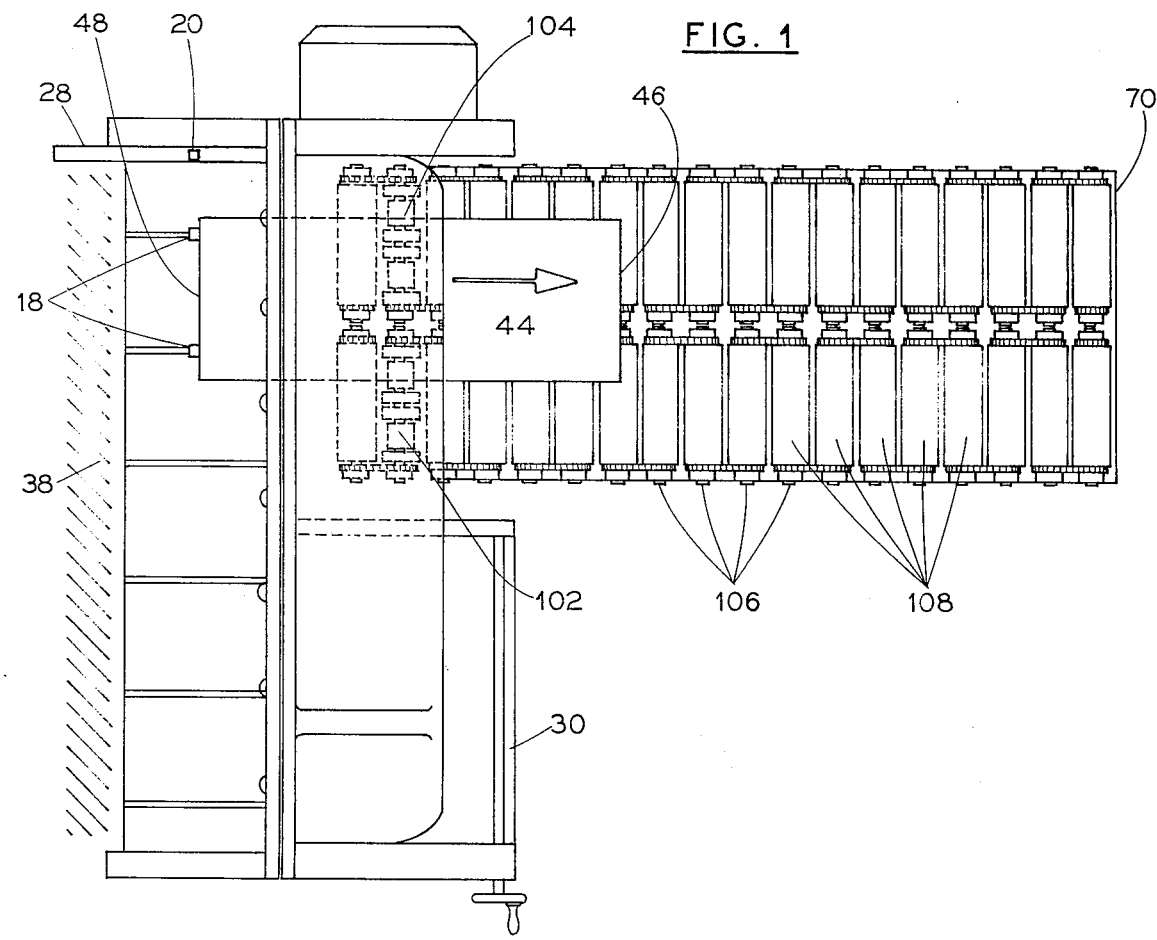
FIG. 1 is a plan view illustrating the combination of squaring shear and shear feed in accordance with the teachings of our present invention.
Figure 2:
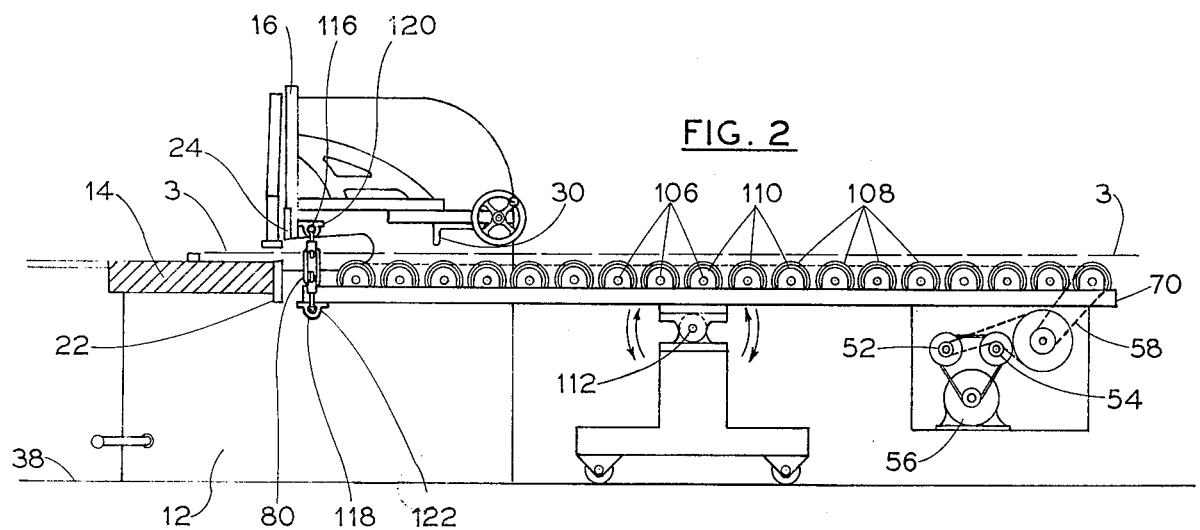
FIG. 2 is a side elevation of the same combination; the rigid frame of the shear has been cut away to show apparatus for connecting the shear feed table to the shear ram.

Referring to the drawing, and particularly to FIGS. 1 and 2, we show a typical power driven squaring shear having a rigid frame 12 carrying a bed 14 and having upright ways to reciprocally guide a ram 16 reciprocated by a suitable eccentricon a main shaft carrying a weighty flywheel. (Not shown). The main shaft usually is driven by a motor through suitable reduction gearing and a single revolution clutch. The shear further comprises a suitable release mechanism for engaging the clutch and causing the shear to turn through one cycle, whereupon it is again stopped. Alternatively, the shear may be powered by hydraulic means and a clutch may not be required but in every case an analogous cyclical motion of the ram is accomplished. The stationary bed 14 carries a stationary lower knife 22 while the reciprocable ram 16 carries an upper knife 24. Front gauges 18 and side gauges 20 and a squaring arm 28 are attached to the bed of the shear and a rear back gauge 30 is mounted parallel to and behind the knives of the shear. These things are all conventional attributes of a squaring shear.

Ordinarily, the operator places a sheet of material 44 between the knives of the shear and onto feed rollers 102, 104 of the shear feed. Motor 56 actuates forward clutch 52 causing the shear feed rollers to rotate in a forward direction, as indicated by the arrow in FIG. 1, carrying leading edge 46 of sheet 44 along generally horizontal feed path 3 a determinate distance beyond the shear whereupon the rollers reverse direction and return the sheet along the same feed path to gauges 18, 20 located at the front of the shear near operator work station 38. In a conventional operation the shear operator loads the work material from a supply station located near work station 38 at the front of the shear, however, a sheet feeding device such as that disclosed in Fowler U.S. Pat. No. 2,650,824, issued Sept. 1, 1953, may be used to load a shear feed from behind a shear as well.

A shear feed for feeding sheets from the back of a shear to the front of a shear may employ various types of transfer apparatus including chain, conveyor belts, mechanical pushers or pneumatic suction devices. In the particular embodiment depicted in FIGS. 1 and 2 of the drawing we show a shear feed having feed rollers 102, 104 and support rollers 108 mounted on rotatable shafts 106 carried by pillow block bearings 110 fastened to a supporting table 70. The rollers are connected one to another by suitable means which allow them to rotate in unison. We show sprockets and chain connecting the rotatable shafts but belts, gears, or other means can be used. Motor 56 and transmission may be connected to any desired one of the rollers, as by means of a chain and sprocket drive as shown at 58 in FIG. 2.

In accordance with one aspect of the present invention, as ram 16 of the shear forcefully descends through its cutting stroke, feed rollers 102, 104 of the shear feed descend in unison and as the ram of the shear returns to rest position at the top of its stroke the feed rollers of the shear feed ascend to a horizontal plane. In FIG. 2 roller table 70 of the shear feed is shown pivotally mounted on shaft 112 that extends across a rigid support stand which rests on casters. The mass of the roller table and apparatus affixed thereto is equally distributed around pivot shaft 112 maintaining the upper assembly of the shear feed balanced below horizontal feed path 3 extending outward from the surface of the bed of the shear. In this embodiment roller table 70 is connected to the ram of the shear by vertical support arm 80, and by horizontal supportive shafts 116, 118 which allow the ram to move the feed rollers of the shear feed down and up. Upper supportive shaft 116 is affixed to the lower surface of the ram by pillow blocks or other suitable means. Lower supportive shaft 118 is similarly affixed to roller table 70 of the shear feed. The support arm 80 depicted in FIG. 2 comprises locking turnbuckle and bearings 120, 122. These bearings are connected to the upper and lower ends of the support arm to retard movement in the shear feed caused by the rotary motion imparted to the supportive structures by ram 16 as it is reciprocated. It is recommended that the top of the feed rollers be held in a fixed position ½ inch (one eighth of an inch) above the height of the lower knife to compensate for flexion in the material or irregularities along the edges of the material which may cause deviation from the feed path and interrupt smooth feeding of sheets between the shear knives. Other embodiments of our invention may use scissors apparatus, springs, or pneumatic or hydraulic lifting devices to perform down and up movement, but in each case the feeding device must be vertically yieldable in order to avoid interfering with the ram of the shear as it moves through its cutting cycle.

In accordance with another aspect of our invention, and with particular reference to FIG. 1, we provide adjacent tracks of magnetic feed rollers, 102 and 104, in combination with the vertically yieldable feed table to facilitate placement of sheet material evenly against front gauges. These magnetic feed rollers can be permanently magnetized, or, preferably, electromagnetic feed rollers of conventional construction or of a construction similar to the electromagnetic feed rollers disclosed in Fowler Patent No. 3,228,680, issued January 11th, 1966, entitled "Magnetic Feed Roll System". When sheet 44 is driven unevenly against squaring arm 28, or unevenly against front stops 18, the operator commands feed roller track 102 to turn in a direction opposite to feed roller track 104, or vice versa, thereby imparting a rotary motion to sheet 44 compelling it to pivot in the direction appropriate to place it properly and squarely against the gauges. In FIG. 3 we show two sets of transmission clutches, 52 and 52A and 54 and 54A, to accommodate the independently actuated tracks of rollers.

The wiring for the shear feed apparatus is shown in FIG. 3 of the drawing. The control mechanisms, including limit switches and programmer, are schematically depicted in FIG. 3 but do ont appear in the mechanical illustrations, FIGS. 1 and 2. Many commercially available programming devices may serve to properly sequence the shear feed and for this reason the programmer apparatus is shown as a black box. For purposes of clarity the diagram shows power supplied from a D.C. source, however, A.C. power may normally be supplied and D.C. power derived from rectifiers where required or desirable. The closing of main switches 210 and 212 connects D.C. source 214 across lines $L_1$ and $L_2$. Motor 56 which is connected directly across the lines runs continuously when the main switches are closed. Conventional fuses or circuit breakers are provided at 216 and 218.

The operation of the shear feed apparatus begins with the ram of the shear at the top of its stroke maintaining upper programmer limit switch 220 open. The operator introduces a sheet between the shear knives and in so doing closes forward limit switch 224. This energizes forward relay KF through a series circuit consisting of switch 224 and normally closed contacts $KR_1$ of reverse relay KR. The closing or relay KF closes normally open contacts $KF_1$ in series with the normally closed programmer contacts $KP_1$ and $KP_2$, and energizes forward magnetic clutch coil 52 and forward magnetic clutch coil 52A causing both tracks of shear feed rollers to rotate in a direction away from the operator as indicated by the arrow in FIG. 1. Energization of KF relay also closes contacts $KF_2$ in series with programmer contacts $KP_5$ and $KP_6$ and energizes magnetic field coils of electromagnetic rollers 102A, 102B, 104A, 104B. In this condition the energized electromagnetic rollers drive the sheet away from the operator along the horizontal feed path until the leading edge 46 of sheet 44 closes contacts of reverse limit switch 226.

The energization of reverse relay KR opens normally closed contacts $KR_1$, deenergizing KF relay and stopping forward rotation of the feed rollers. Energization of KR relay closes normally open contacts $KR_3$ in series with the normally closed programmer contacts $KP_3$ and $KP_4$ and energizes reverse magnetic clutch coil 54, and reverse magnetic clutch coil 54A. The electromagnetic rollers now turn in the reverse direction carrying sheet 44 toward the operator until edge 48 is intercepted by front stops 18 (FIG. 1). The operator determines that the sheet is firmly in proper position from his vantage point in front of the shear. If, however, sheet 44 comes to rest in a skewed or uneven position the operator may call for alternate rotation of the magnetic roller tracks to squarely position the material against stops 18 and 20. This is accomplished by opening and closing at alternate intervals programmer contacts $KP_3$ and $KP_4$ causing alternate rotation of reverse magnetic clutches 54 and 54A. When the sheet is positioned and adequate front gauge contact is achieved the operator cycles the shear parting the sheet. Lower programmer limit switch 222 is closed by the shear ram as it moves through the cutting cycle allowing the programmer apparatus to count a complete cycle. Conventionally, a parted sheet is squared on all sides before submitting it to secondary fabricating operations. For this reason the primary function of the programmer is to count the number of cuts required to square, resquare and cut secondarily the parted sheet before delivering the sheet remaining on the shear feed to the operator. When the sheet has been completely sheared to size forward limit switch 224 is released and assumes its normally open position recycling the entire shear feed apparatus.

Parted sheets or blanks are finished and ready for secondary fabrication when they have been completely squared, which is to say that each corner forms a right angle. In a secondary cutting operation it is sometimes desirable and more expedient to cut finished blanks to smaller sizes at a back gauge rather than to a front gauge. Therefore the embodiment of our invention depicted in FIGS. 1 and 2 of the drawing shows a shear feed extending across a fraction of the width of the shear knives rather than across the full width. In this configuration, front gauging, or front gauge squaring and re-squaring of blanks is accomplished at the side of the shear served by the shear feed and back gauging of sheets or finished blanks is done to back gauge 30, at the opposite side of the shear.

It will be understood that while we have described preferred embodiments and a preferred method of using our invention changes may be made by persons skilled in the art without departing from the scope of our invention as defined by the following claims.

We claim:

1. In a fabricating system in which a squaring shear has a stationary bed carrying a stationary lower knife and has a vertically reciprocative ram carrying an upper knife and has positioning stop means for sheets located close to a work station at the front thereof, said positioning means disposed transverse to a feed path for sheets, and in which the squaring shear acts to sever positioned sheets disposed along said feed path, the combination with said squaring shear, of feeding apparatus for sheets located immediately behind and adjacent to the stationary lower knife, said apparatus being vertically yieldable when the shear ram descends in order to avoid interference with ram operation, in which the mass of said vertically yieldable apparatus is counterbalanced around a pivoted support located behind the stationary lower knife, said apparatus including power operated driving means conjoined with magnetic sheet holding means to move a sheet along said feed path away from said positioning means, electrical control means for determining limits of sheet movement away from said positioning means, and means for reversing said driving means automatically after completion of a preset number of shearing cycles to return a sheet along said path to said positioning means.

2. In a fabricating system as set forth in claim 1 in which the driving means conjoined with magnetic sheet holding means comprises electromagnetic roll means.

3. In a fabricating system as set forth in claim 1 in which the transfer means is divided into separate sections located on opposite sides of a center line of said feed path, and means for actuating each of said sections when the other sections are not actuated.

4. In a fabricating system as set forth in claim 3 in which the transfer means comprises driving means conjoined with magnetic sheet holding means.

5. In a fabricating system as set forth in claim 4 in which the driving means conjoined with magnetic sheet holding means comprises electromagnetic roll means.

6. In a fabricating system in which a squaring shear has a stationary bed carrying a stationary lower knife and has a vertically reciprocative ram carrying an upper knife, and has a positioning stop means for sheets located close to a work station at the front thereof, said positioning means disposed transverse to a feed path for sheets, and in which the squaring shear acts to sever positioned sheets disposed along said feed path, the combination with said squaring shear, of feeding apparatus for sheets located immediately behind and adjacent to the stationary lower knife, said apparatus being vertically yieldable when the shear ram descends in order to avoid interference with ram operation, said apparatus including power operated transfer means to move sheets along said feed path away from said positioning means and electrically controlled mechanisms for reversing said transfer means to return sheets along said feed path to said positioning means, in which said transfer means is divided into separate sections located on opposite sides of a center line of said feed path, and means for actuating each of said sections when the other sections are not actuated.

7. In a fabricating system in which a squaring shear has a stationary bed carrying a stationary lower knife and has a vertically reciprocative ram carrying an upper knife, and has positioning stop means for sheets located close to a work station at the front thereof, said positioning means disposed transverse to a feed path for sheets, and in which the squaring shear acts to sever positioned sheets disposed along said feed path, the combination with said squaring shear, of feeding apparatus for sheets located immediately behind and adjacent to the stationary lower knife, said apparatus being vertically yieldable when the shear ram descends in order to avoid interference with ram operation, said apparatus including power operated driving means conjoined with magnetic sheet holding means to move sheets along said feed path away from said positioning means and electrically controlled mechanisms for reversing said driving means to return sheets along said feed path to said positioning means, in which said driving means conjoined with sheet holding means is divided into separate sections located on opposite sides of a center line of said feed path, and means for actuating each of said sections when the other sections are not actuated.

8. In a fabricating system in which a squaring shear has a stationary bed carrying a stationary lower knife and has a vertically reciprocative ram carrying an upper knife, and has positioning stop means for sheets located close to a work station at the front thereof, said positioning means disposed transverse to a feed path for sheets, and in which the squaring shear acts to sever positioned sheets disposed along said feed path, the combination with said squaring shear, of feeding apparatus for sheets located immediately behind and adjacent to the stationary lower knife, said apparatus being vertically yieldable when the shear ram descends in order to avoid interference with ram operation, said apparatus including power operated electromagnetic roll means to move sheets along said feed path away from said positioning means and electrically controlled mechanisms for reversing said electromagnetic roll means to return sheets along said feed path to said positioning means, in which said electromagnetic roll means is divided into separate sections located on opposite sides of a center line of said feed path, and means for actuating each of said sections when the other sections are not actuated.

* * * * *